United States Patent
Lao (10) Patent No.: US 10,753,283 B2
(45) Date of Patent: Aug. 25, 2020

(54) COMBUSTOR HEAT SHIELD COOLING HOLE ARRANGEMENT

(71) Applicant: PRATT & WHITNEY CANADA CORP., Longueuil (CA)

(72) Inventor: Si-Man Amy Lao, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 558 days.

(21) Appl. No.: 15/463,254

(22) Filed: Mar. 20, 2017

(65) Prior Publication Data
US 2018/0266324 A1    Sep. 20, 2018

(51) Int. Cl.
| F02C 7/18 | (2006.01) |
| F23R 3/00 | (2006.01) |
| F02C 7/24 | (2006.01) |
| F23R 3/06 | (2006.01) |
| F02C 7/264 | (2006.01) |

(52) U.S. Cl.
CPC ............ F02C 7/18 (2013.01); F02C 7/24 (2013.01); F23R 3/002 (2013.01); F23R 3/06 (2013.01); *F02C 7/264* (2013.01); *F05D 2220/32* (2013.01); *F05D 2240/35* (2013.01); *F05D 2260/202* (2013.01); *F23R 2900/03042* (2013.01)

(58) Field of Classification Search
CPC .... F02C 7/24; F02C 7/264; F02C 7/18; F23R 3/0002; F23R 3/002; F23R 3/06; F23R 3/04; F23R 2900/03041; F23R 2900/03042; F05D 2220/32; F05D 2240/35; F05D 2260/202
See application file for complete search history.

(56) References Cited

U.S. PATENT DOCUMENTS

| 5,367,869 | A | * | 11/1994 | DeFreitas | ............... F02C 7/264 60/39.821 |
| 5,687,572 | A | * | 11/1997 | Schrantz | ................. F23R 3/007 431/352 |
| 5,775,108 | A | | 7/1998 | Ansart et al. | |
| 6,145,319 | A | | 11/2000 | Burns et al. | |
| 6,408,629 | B1 | | 6/2002 | Harris et al. | |
| 6,668,559 | B2 | * | 12/2003 | Calvez | .................... F23R 3/007 60/753 |
| 7,000,397 | B2 | | 2/2006 | Pidcock et al. | |

(Continued)

FOREIGN PATENT DOCUMENTS

WO    WO-2015023764 A1 *    2/2015    ............... F23R 3/12

*Primary Examiner* — Craig Kim
(74) *Attorney, Agent, or Firm* — Norton Rose Fulbright Canada LLP (57) ABSTRACT

A combustor heat shield has a heat shield body having a first surface configured to face a combustor shell and an opposed second surface configured to face towards the combustion gases in the combustion chamber. A dilution or igniter hole is defined in the heat shield body. An array of circumferentially spaced-apart cooling holes is provided around the at least one dilution or igniter hole. The cooling holes are oriented to locally deliver a swirl of cooling air around an axis of the dilution or igniter hole. The cooling holes are angled relative to the heat shield body and extend from an inlet on the first surface to an outlet on the second surface. The outlet is positioned closer to a perimeter of the dilution or igniter hole than the inlet.

20 Claims, 6 Drawing Sheets

(56) References Cited

U.S. PATENT DOCUMENTS

| | | | | |
|---|---|---|---|---|
| 7,506,512 B2* | 3/2009 | Schumacher | ............ | F23R 3/12 60/754 |
| 7,631,502 B2* | 12/2009 | Burd | ........................ | F23R 3/06 60/752 |
| 9,062,884 B2* | 6/2015 | Rudrapatna | ............. | F23R 3/045 |
| 10,502,422 B2* | 12/2019 | Cunha | ....................... | F02C 7/18 |
| 2007/0062202 A1* | 3/2007 | Stastny | .................... | F23R 3/60 60/796 |
| 2009/0064657 A1* | 3/2009 | Zupanc | .................. | F02C 7/264 60/39.821 |
| 2011/0120132 A1* | 5/2011 | Rudrapatna | ............ | F02C 7/264 60/752 |
| 2013/0340437 A1* | 12/2013 | Erbas-Sen | ................ | F23R 3/06 60/754 |
| 2014/0260257 A1* | 9/2014 | Rullaud | ................... | F23R 3/06 60/722 |
| 2015/0135719 A1* | 5/2015 | Gerendas | ............... | F23R 3/002 60/752 |
| 2016/0237896 A1* | 8/2016 | Leglaye | ................... | F23R 3/04 |
| 2016/0265777 A1 | 9/2016 | Hoke et al. | | |
| 2016/0305663 A1* | 10/2016 | Lebel | ..................... | F23R 3/002 |
| 2016/0327272 A1 | 11/2016 | Sandoval et al. | | |

* cited by examiner

COMBUSTOR HEAT SHIELD COOLING HOLE ARRANGEMENT

TECHNICAL FIELD

The application relates generally to gas turbine engines and, more particularly, to cooling heat shields for combustors and the like.

BACKGROUND OF THE ART

Gas turbine combustors are the subject of continual improvement, to provide better cooling, better mixing, better fuel efficiency, better performance, etc. at a lower cost. For example, heat shields are known to provide better protection to the combustor, but heat shields also require cooling. Although heat shield cooling schemes are known in the art, there is a continuing need for improvement.

SUMMARY

In one aspect, there is provided a heat shield configured to be mounted to an inner surface of a combustor shell defining a combustion chamber of a gas turbine engine combustor; the heat shield comprising: a heat shield body having a first surface configured to face the combustor shell and an opposed second surface configured to face towards the combustion gases in the combustion chamber; at least one dilution or igniter hole defined in the heat shield body; and an array of circumferentially spaced-apart cooling holes bordering the at least one dilution or igniter hole and oriented to deliver a swirl of cooling air around an axis of the at least one dilution or igniter hole, the circumferentially spaced-apart cooling holes extending at an inclination angle relative to a normal of a surface of the heat shield body from an inlet on the first surface to an outlet on the second surface, the outlet end being closer to a perimeter of the at least one dilution or igniter hole than the inlet end.

In another aspect, there is provided a gas turbine engine combustor comprising: a shell defining a combustion chamber; a heat shield mounted to an inner surface of the shell and having a back side facing the inner surface of the combustor shell and an opposed front side facing the combustion chamber; at least one dilution or igniter hole extending through the heat shield; and an array of circumferentially spaced-apart cooling holes extending through the heat shield around the at least one dilution or igniter hole and oriented to deliver cooling air in a circular pattern around the at least one dilution or igniter hole, each of the circumferentially spaced-apart cooling holes extending from an inlet end on the back side of the heat shield to an outlet end on the front side of the heat shield, the circumferentially spaced-apart cooling holes being angled relative to the heat shield so that the outlet end be disposed closer to the at least one dilution or igniter hole than the inlet end.

DESCRIPTION OF THE DRAWINGS

Reference is now made to the accompanying figures in which:

FIG. 5 is a front isometric cross-section view with a solid cylinder to extending through a cooling hole to schematically illustrate the angular orientation of the cooling hole relative to the dilution hole, the;

DETAILED DESCRIPTION

Figure 1:
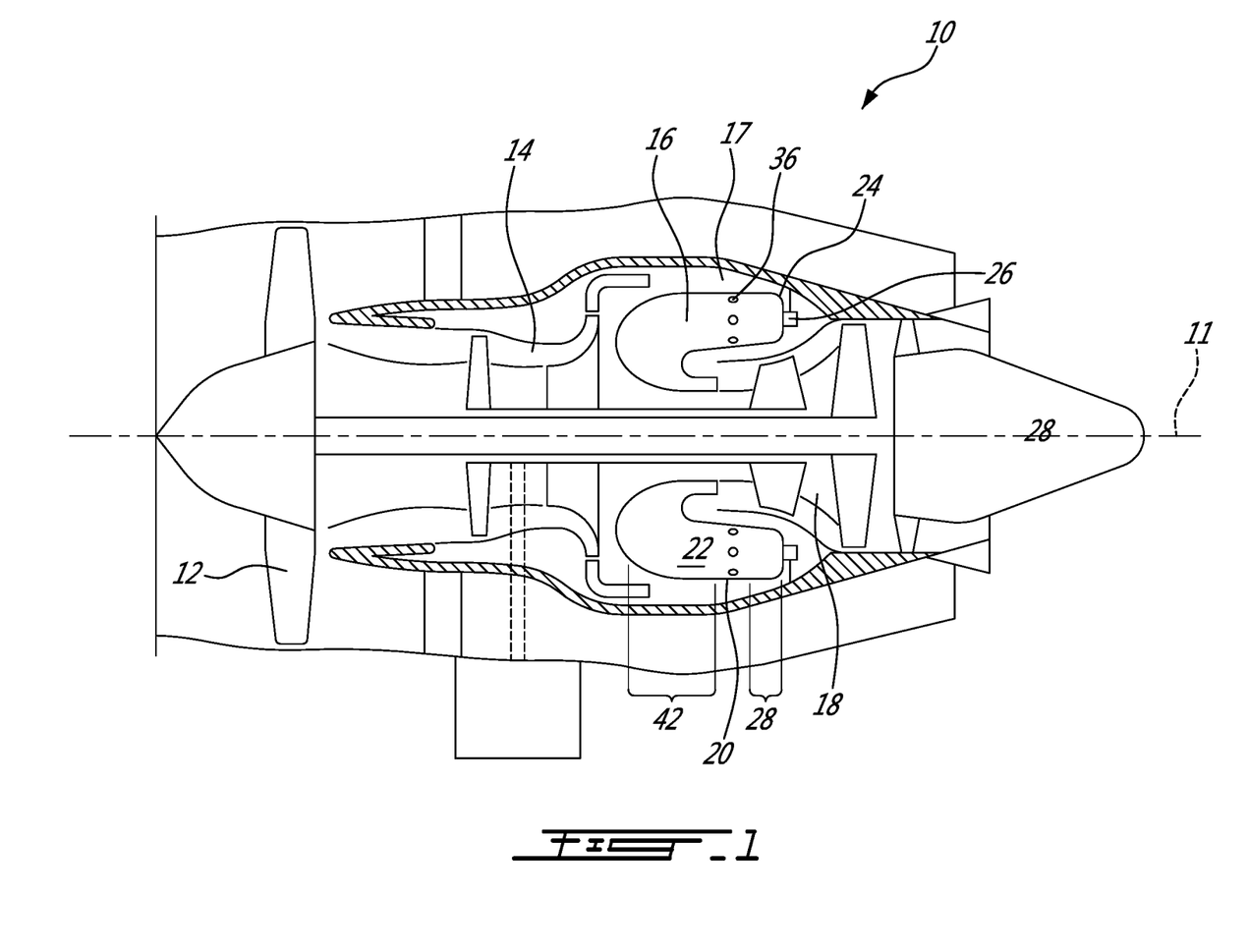
FIG. 1 is a schematic cross-section view of a gas turbine engine.

FIG. 1 illustrates a gas turbine engine 10 of a type preferably provided for use in subsonic flight, generally comprising in serial flow communication along a central axis 11 defining an axial direction: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
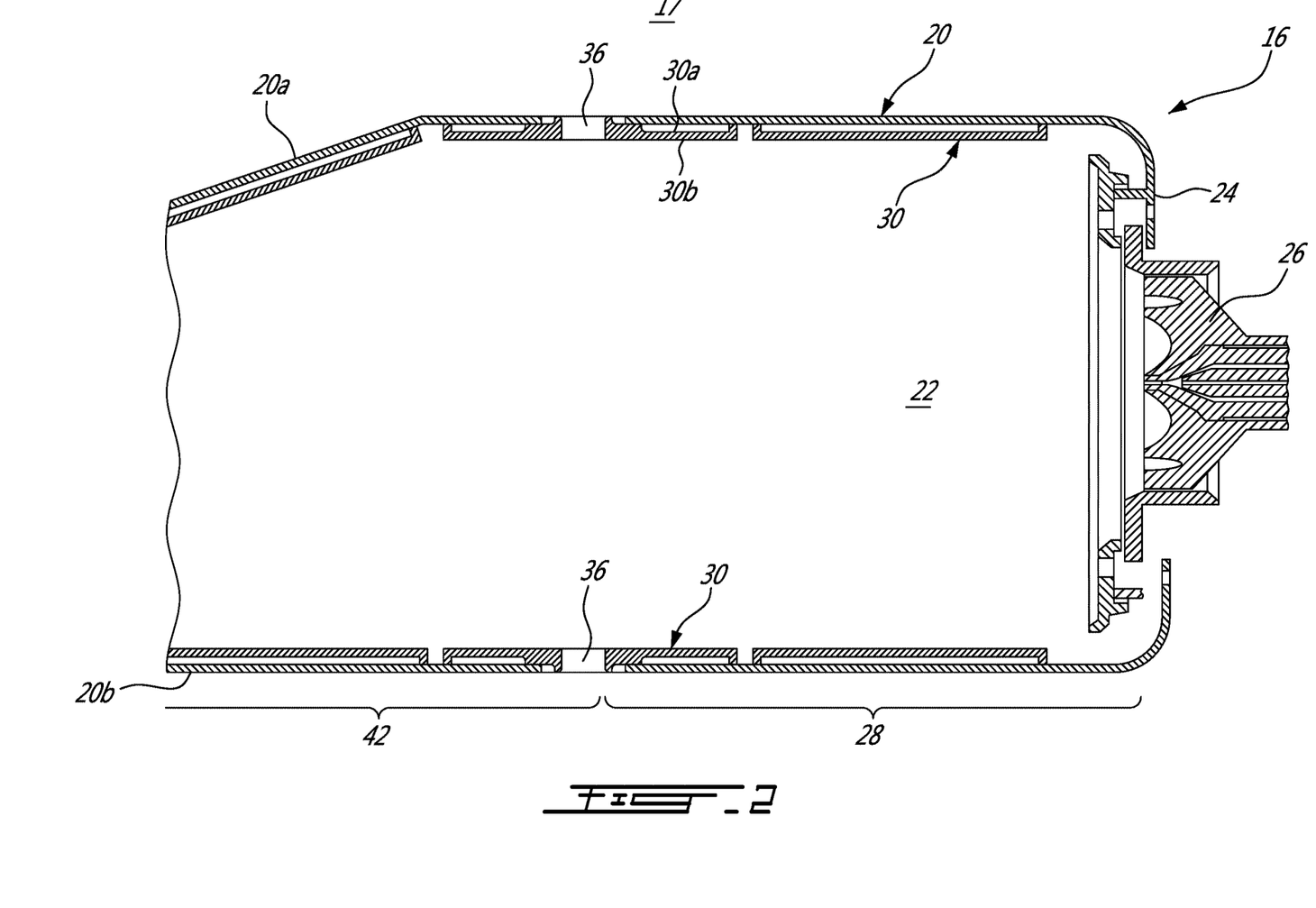
FIG. 2 is a schematic cross-section view of a combustor of the engine.
Figure 3:
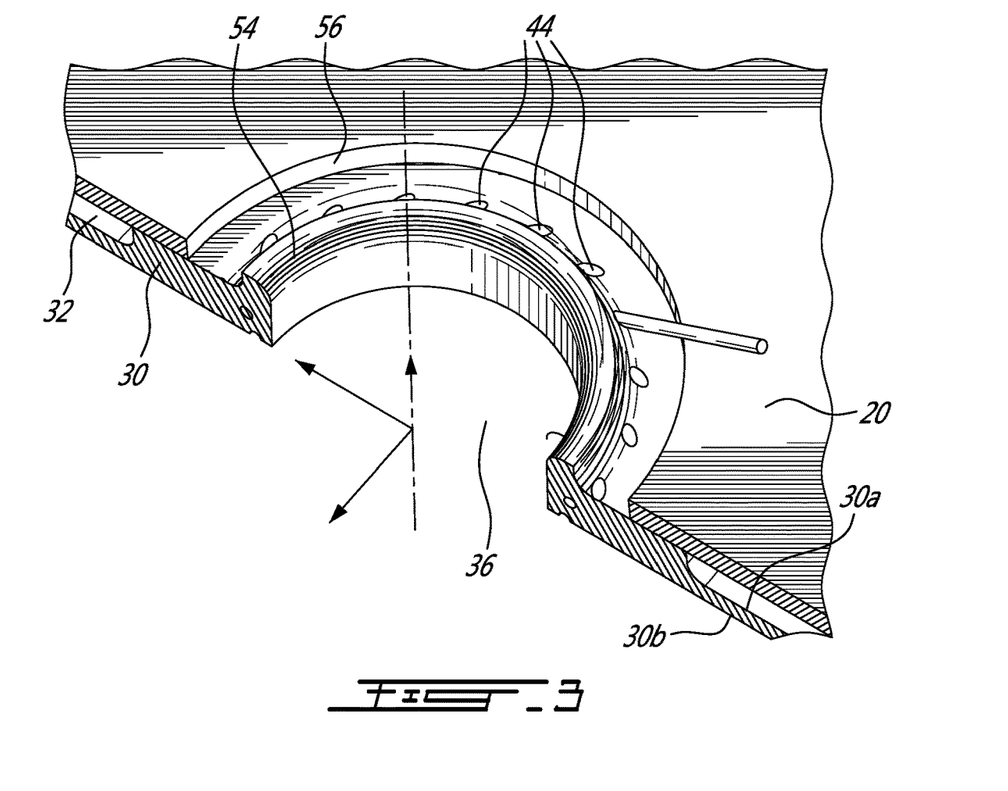
FIG. 3 is a top isometric cross-section view illustrating a row of swirling cooling holes around a dilution hole extending through a heat shield of the combustor shown in FIG. 2.
Figure 4:
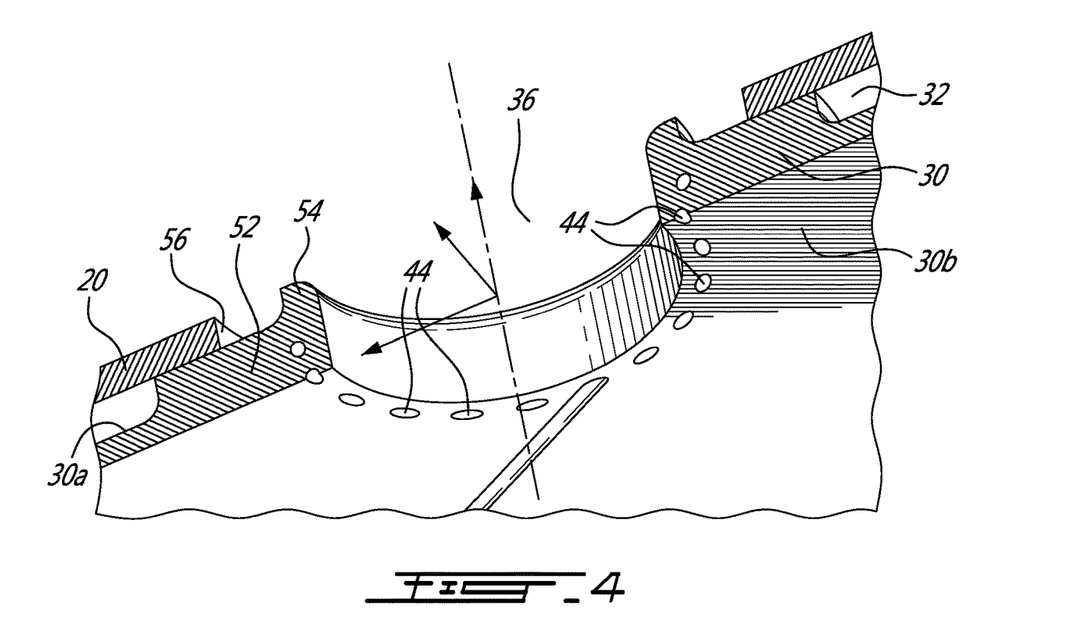
FIG. 4 is a bottom isometric cross-section view illustrating the row of swirling cooling holes around the dilution hole.

The combustor 16 is housed in a plenum 17 supplied with compressed air from compressor 14. The combustor 16 includes an annular shell 20 defining a combustion chamber 22 where the gases are ignited and the combustion takes place. As shown in FIG. 2, the shell 20 may include a radially outer combustor shell member 20a and a radially inner combustor shell member 20b extending axially from an annular inlet dome or bulkhead 24 to which a circumferential array of fuel nozzles 26 are mounted for injecting a fuel mixture into a primary zone 28 of the combustion chamber 22. The outer and inner combustor shell members 20a, 20b are provided on an inner side thereof with heat shields 30. Each heat shield 30 has a heat shield body having a back or cold side also herein referred to as an outwardly facing surface configured to face the combustor shell 20 and an opposed front surface or inwardly facing surface (i.e. hot side) configured to be exposed to combustion gases in the combustion chamber 22. Each heat shield 30 may be circumferentially segmented into a plurality of heat shield panels, as known in the art. It is also understood that each heat shield may comprise more than one circumferential row of heat shield bodies or panels along the axial length of the combustor shell 20. The heat shields 30 protect the combustor shell from the high temperatures generated by the combustion in the combustion chamber 22. A cooling air gap 32 is provided between the heat shields 30 and the combustor shell 20. Impingement holes (not shown) are defined in the combustor shell 20 for directing impingement jets through the air gap 32 against the back side or outwardly facing surface 30a of the heat shields 30.

Dilution jet holes 36 extend through the combustor shell 20 and the heat shields 30 to modulate the combustion gases before being delivered to the turbine section 18. More particularly, the dilutions holes 36 fluidly communicate with plenum 17 for directing a flow of dilution air from the plenum 17 into the combustion chamber 22 so as to improve emissions, reduce and control the temperature profile of combustion gases at the combustor outlet and to protect the turbine section 18 from overheating. The combustion chamber 22 is at a pressure P4 lower than a pressure P3 of the plenum 17, which enables the flow of air through the dilution holes 36 toward the region of lower pressure P4. The dilution holes 36 are disposed between the primary zone 28 and a secondary zone 42 of the combustor 16. The secondary zone 42 is disposed downstream from the primary zone 28.

Dilution holes 36 are prone to localized hot gas ingestion and/or high heat load zones, resulting in hot spots caused by entrained combustion gasses. Over time, the hot spot regions deteriorate and the dilution holes 36 lose their shape, affecting performance of the combustor and the overall engine.

FIGS. 3 to 7 illustrate an example of an angular swirl pattern that may be provided locally around a dilution hole 36 in a heat shield 30 to maintain acceptable temperature all around the edge of the dilution hole 36. According to the illustrated embodiment, this is achieved by providing an array of circumferentially spaced-apart cooling holes, such as a circular row of angled effusion cooling holes 44, around the dilution hole 36 in the heat shield 30, the cooling holes 44 being oriented to deliver cooling air in a circular pattern around the axis of the dilution hole 36 on the hot side (inwardly facing surface 30b) of the heat shield 30. Each cooling hole 44 extends axially from an inlet end 44a on the outwardly facing surface 30a (cold side) of the heat shield 30 to an outlet end 44b on the inwardly facing surface 30b of the heat shield 30. As can be appreciated from FIG. 6, the inlet ends 44a and the outlet ends 44b can be respectively distributed on first and second concentric circles, the first circle surrounding the second circle. According to the illustrated embodiment the rows of inlet ends 44a and outlet ends 44b are also concentric relative to the dilution hole 36. However, the array of circumferentially spaced-apart holes could also be provided in the form of a staggered pattern of alternating holes placed at different distance away from the dilution hole edge/periphery.

According to one aspect of the illustrated embodiment, the cooling holes 44 have a specific orientation which allows them to be placed as close as possible to the dilution hole edge to ensure proper cooling of the dilution hole edge region. More particularly, according to the illustrated example, the cooling holes 44 have a compound angle that allows for the cooling air to exit as close as possible to the edge of the dilution hole 36 on the hot side of the heat shield 30 with the minimal wall thickness "MWT" (see FIG. 5) between the dilution hole 36 and the cooling hole 44 right at the outlet end 44b of the cooling hole 44 on the hot side of the heat shield 30. This placement of the outlet end 44b of the cooling holes 44 may be achieved by orienting each cooling hole such that its outlet end 44b is tangential to the edge of the dilution hole 36. Doing so also contributes to minimize the chances of interference or perforation through the wall of the dilution hole 36, thereby improving manufacturability.

Figure 5:
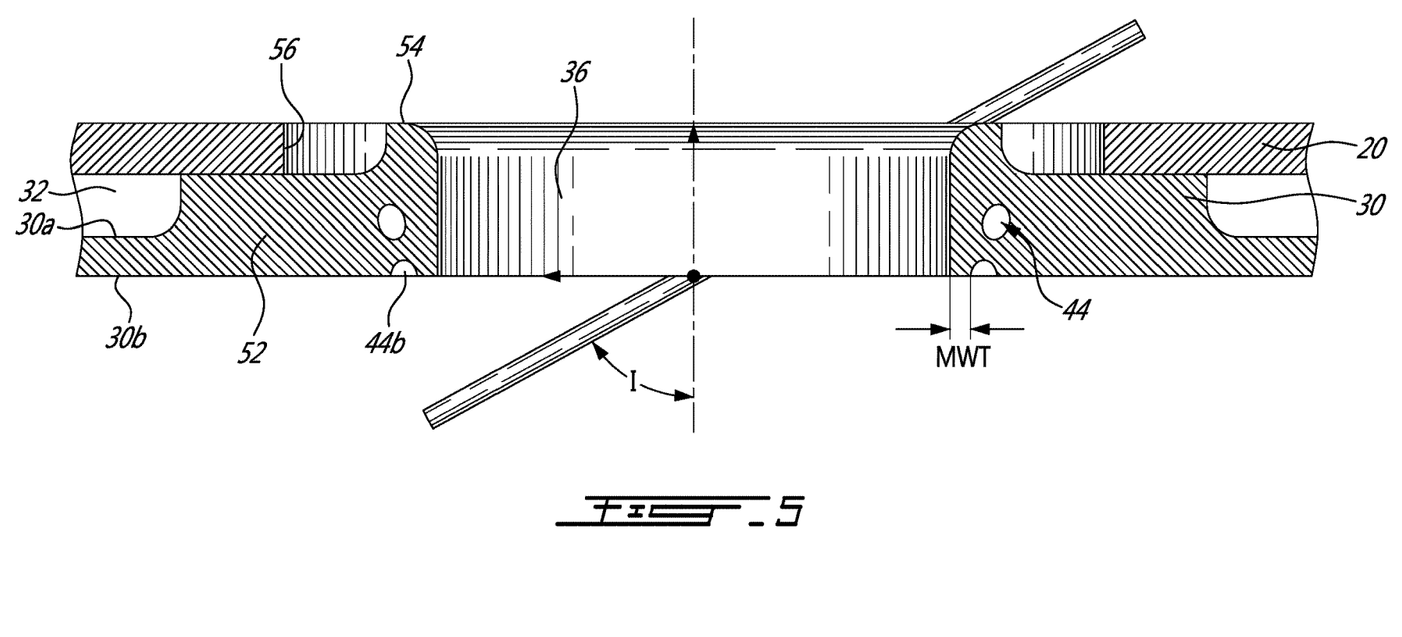
Figure 7:
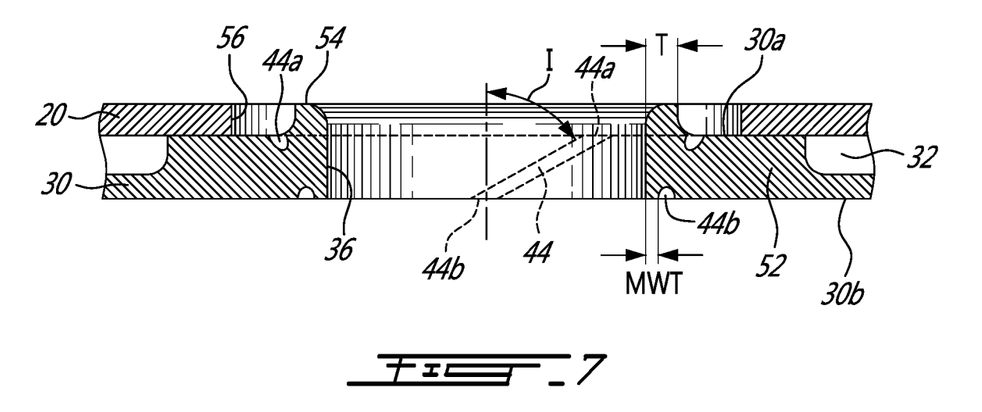
FIG. 7 is a profile cross-section view illustrating the inclination angle of a cooling hole relative to a normal of the plane of the heat shield and the outlet end of the cooling hole centered relative to the center of the dilution hole.

The compound angle of the cooling holes comprises 1) an inclination angle and 2) a tangential/circumferential angle. As schematically depicted by the solid cylinder in FIGS. 3 to 5, the cooling holes 44 are angled relative to the inwardly and outwardly facing surfaces 30b, 30a of the heat shield 30 (i.e. the holes 44 are not perpendicular to the heat shield surface). The holes 44 are inclined so that the length vs diameter ratio is significantly greater than holes extending perpendicularly through the heat shield. This allows enhancing in-hole convection heat transfer with the possibility of generating a cooling film on the hot side of the heat shield 30 depending on local flow conditions. Indeed, with perpendicular holes, the length vs diameter ratio is small and the exiting air has little hope of film formation, whereby the cooling capability of such perpendicular holes for the same amount of air consumed is, therefore, inferior. The inclination angle "I" is best shown in FIGS. 5 and 7. The inclination angle "I" can be defined as the angle between the axis of the cooling hole 44 and a normal to the plane of the heat shield 30. According to one application, the inclination angle "I" is comprised between 10 and 75 degrees.

Figure 6:
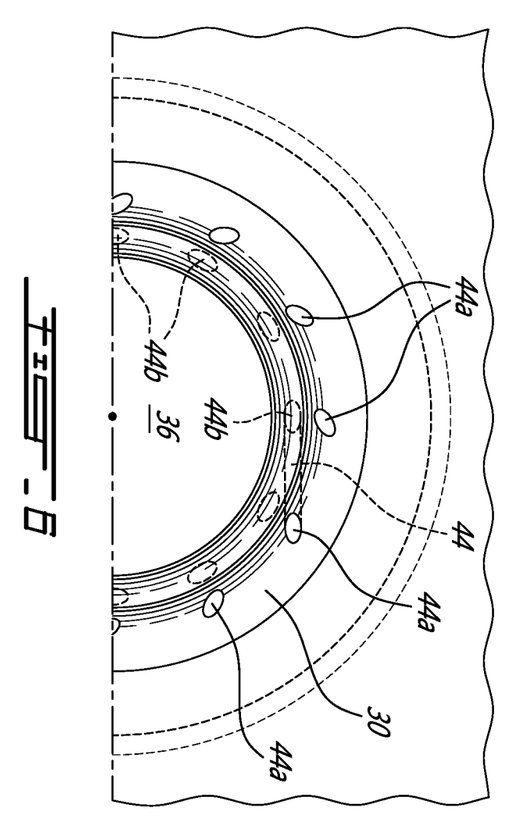
FIG. 6 is a top "wire-frame" view of one half the dilution hole and the bordering cooling holes and illustrating the disposition of the inlet and outlet ends of the cooling holes relative to the dilution hole, only the edges of the geometry are shown, the surface being made transparent.

The second angle of the compound angle of the cooling holes 44 corresponds to the orientation of a projection of the cooling hole axis in the plane of the heat shield with respect to the dilution hole circumference. This second angle or orientation of the cooling holes 44 is selected so that the oval footprints of the outlet ends 44b of the inclined cooling holes 44 all point generally tangentially in a common clockwise or counter-clockwise direction (i.e. in a common circumferential direction) so as to cause the air to be delivered on the hot side of the heat shield 30 in a circular fashion around the dilution hole 36. According to the illustrated embodiment and as best shown in FIGS. 5 to 7, the tangential/circumferential orientation of the cooling hole axis is selected so that the outlet end 44b of each cooling hole 44 on the hot side of the heat shield 30 is tangential to the edge of the dilution hole 36. This can be appreciated by the fact that the outlet end 44b of the depicted cooling hole 44 is centered relative to the center of the dilution hole 36. That is the major axis of the oval exit footprint is tangential to the dilution hole 36 while the minor axis of the oval footprint intersects the center of the dilution hole 36, as shown in FIGS. 5 and 7. This allows achieving the minimal wall thickness "MWT" on exit. In other words, it allows the exit point of the cooling holes 44 to have the closest approach to the dilution hole edge (thinnest wall) on the hot side while having a much higher thickness on the same wall from the cold side of the heat shield 30. This can be readily appreciated from FIG. 7, where the wall thickness MWT on the hot side of the heat shield 30 is much thinner than the wall thickness T on the cold side of the heat shield. This improves manufacturability without compromising cooling performance. Also by having the oval footprint of the hole outlet oriented tangent to the dilution hole edge, the chances of punching through the dilution wall is reduced during manufacturing of the cooling holes around the dilution hole. This improves manufacturability without compromising cooling performance. In contrast, if the oval exit footprint and, thus the hole axis, of the cooling holes would point towards the center of the dilution hole, a closest approach to the dilution hole on the hot side would not be possible due to edge interference and no swirl of cooling air would be induced around the dilution holes no circumferential momentum would be imparted to the delivered air.

Figure 8:
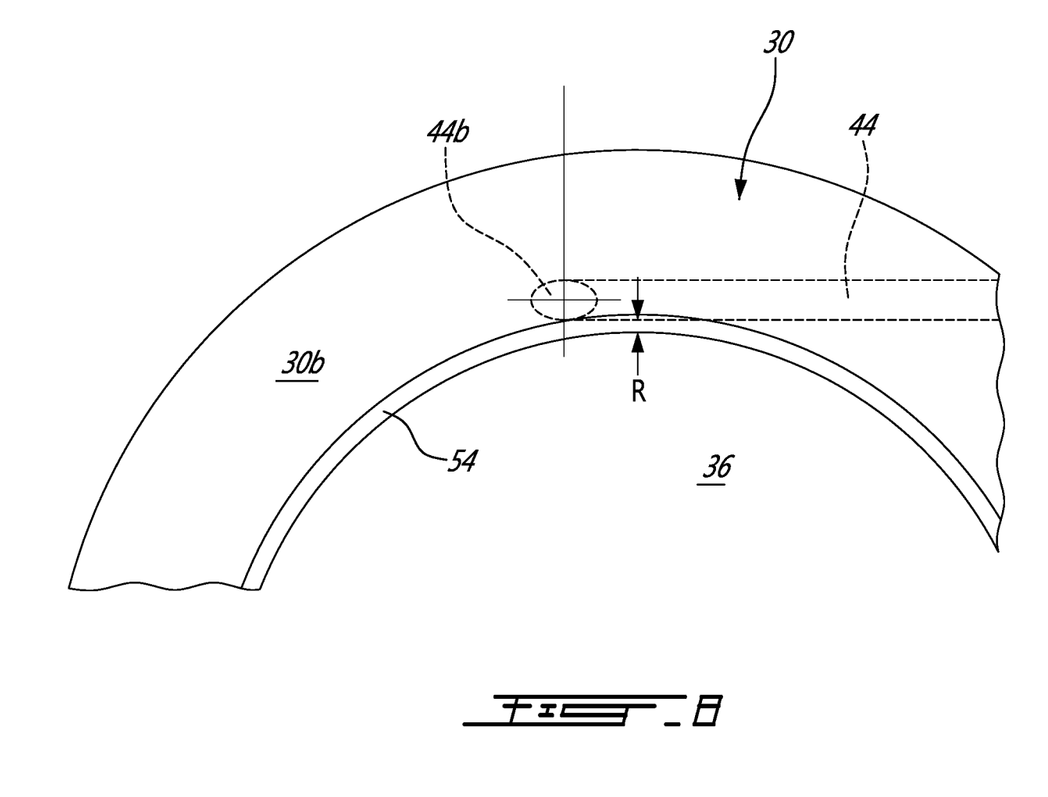
FIG. 8 is a schematic bottom view illustrating a cooling hole having an outlet end that is non tangential to the dilution hole to provide the thinnest wall section between the cooling hole and the dilution hole somewhere along the length of the cooling hole between the inlet and outlet ends thereof.

FIG. 8 shows a variant where the exit footprint of at least one of the cooling holes bordering the dilution hole 36 points at an angle away from the tangent of the dilution hole edge such that the thinnest wall region R is located somewhere between the cold and hot sides of the heat shield 30 as opposed to on the hot side. It can be appreciated that in such a case, the minor axis of the oval outlet end 44b of the cooling hole 44 is offset relative to the center of the dilution hole 36 (i.e. the minor axis does not intersect the center of the heat shield as viewed when projected in the plane of the heat shield). However, the axis of the cooling hole 44 still has a tangential component to cooperate with the other cooling holes (not shown) to induce a swirl of cooling air around the dilution hole 36.

The cooling holes 44 can be made by any suitable manufacturing methods such as laser drilling, electrical discharge machining (EDM) and water jet to name a few. According to the illustrated embodiment, the cooling holes 44 are defined in a dilution hole boss 52 around a circumferentially extending lip 54. The lip 54 is optional but the exit position of the cooling holes allows for this option to exist on the part. The heat shield lip 54 projects into a larger circular hole 56 defined in the combustor shell 20. Still according to the illustrated embodiment, the inlet ends 44a fluidly communicate directly with the P3 air in plenum 17. This can be readily appreciated from FIG. 3. However, it is understood that inlet end 44a of the cooling holes 44 could also originate from within the gap 32 between the shell 20 and the heat shield 30 instead of the plenum 17.

It is also contemplated to use a partial ring of locally swirling cooling holes as opposed to a full ring as described herein above. It is also noted that the above described locally swirling cooling hole patterns could be used to provide cooling around other heat shield features, such as igniter holes.

In use, cooling air flows from the plenum 17 through the cooling holes 44. The cooling air picks up heat from the heat shield 30 as it travels through its thickness (primary heat removal mechanism) and is then delivered in a circumferential/tangential fashion with respect to the dilution hole axis on the hot side of the heat shield. The delivered air may under certain conditions form a protective film around the dilution hole, thereby providing a secondary heat removal mechanism. Indeed, depending on the direction at which the cooling air exits with respect to the hot mainstream flow, the distance over which the exit film may last before being blown off may vary.

The various locally swirling cooling hole designs herein contemplated are particularly useful in a double or multi-skin combustor configuration where the regions around the dilution holes tend to be difficult to cool due to sealing rails and overlapping parts.

At least some of the above described embodiments improve cooling locally around dilution or igniter holes by providing optimum placement of the hole exits and as such contribute to improve the durability and reliability of the heat shield resulting in lower maintenance costs. In one aspect, at least some of the embodiments allow using the in-hole convection heat transfer component within the cooling hole as close as possible to the edge of the dilution hole for a more effective and resilient means of cooling.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A heat shield configured to be mounted to an inner surface of a combustor shell defining a combustion chamber of a gas turbine engine combustor; the heat shield comprising: a heat shield body having a first surface configured to face the combustor shell and an opposed second surface configured to face toward combustion gases in the combustion chamber; a boss formed in the heat shield body; at least one dilution or igniter hole defined in the boss; and an array of circumferentially spaced-apart cooling holes bordering the at least one dilution or igniter hole and extending through the boss, the array of circumferentially spaced-apart cooling holes oriented to deliver a swirl of cooling air around an axis of the at least one dilution or igniter hole, the circumferentially spaced-apart cooling holes extending at an inclination angle relative to a normal of the first surface of the heat shield body, the circumferentially spaced-apart cooling holes extending from an inlet on the first surface to an outlet on the second surface, the outlet being closer to a perimeter of the at least one dilution or igniter hole than the inlet, wherein the outlets of the circumferentially spaced-apart cooling holes are oriented tangent to the at least one dilution or igniter hole.

2. The heat shield defined in claim 1, wherein the outlets of the circumferentially spaced-apart cooling holes are immediately adjacent to an edge of the at least one dilution or igniter hole.

3. The heat shield defined in claim 1, wherein the circumferentially spaced-apart cooling holes are provided in a concentric circular configuration around the at least one dilution or igniter hole.

4. The heat shield defined in claim 1, wherein each outlet of the circumferentially spaced-apart cooling holes has an oval footprint on the second surface of the heat shield body, the oval footprint having a major axis and a minor axis, and wherein the major axis does not intersect the at least one dilution or igniter hole.

5. The heat shield defined in claim 4, wherein the major axis is generally tangent to the at least one dilution or igniter hole.

6. The heat shield defined in claim 5, wherein a thinnest wall region between the circumferentially spaced-apart cooling holes and the at least one dilution or igniter hole is located at the outlets of the cooling holes on the second surface of the heat shield body.

7. The heat shield defined in claim 4, wherein the major axis extends at an angle away from a tangent of the at least one dilution or igniter hole such that a thinnest wall region between the cooling holes and the at least one dilution or igniter hole is located between the first and second surfaces.

8. The heat shield defined in claim 1, wherein the inlets and the outlets of the circumferentially spaced-apart cooling holes respectively lie on first and second concentric circles around the at least one dilution or igniter hole, the second circle surrounding the first circle.

9. The heat shield defined in claim 1, wherein the circumferentially spaced-apart cooling holes are distributed along only a portion of a circumference of the at least one dilution or igniter hole to form a partial ring of locally swirling cooling holes.

10. A gas turbine engine combustor comprising: a shell defining a combustion chamber; a heat shield mounted to an inner surface of the shell and having a back side facing the inner surface of the combustor shell and an opposed front side facing the combustion chamber; a boss formed in the heat shield; at least one dilution or igniter hole extending through the boss; and an array of circumferentially spaced-apart cooling holes extending through the boss around the at least one dilution or igniter hole and oriented to deliver cooling air in a circular pattern around the at least one dilution or igniter hole, each of the circumferentially spaced-apart cooling holes extending from an inlet end on the back side of the heat shield to an outlet end on the front side of the heat shield, the circumferentially spaced-apart cooling holes being angled relative to the heat shield so that the outlet end be disposed closer to the at least one dilution or igniter hole than the inlet end, wherein a thinnest wall region between the circumferentially spaced-apart cooling holes and the at least one dilution or igniter hole is located at the outlet ends of the cooling holes on the front side of the heat shield.

11. The gas turbine engine combustor defined in claim 10, wherein the outlet ends of the circumferentially spaced-apart cooling holes are oriented tangent to the at least one dilution or igniter hole.

12. The gas turbine engine combustor defined in claim 10, wherein the circumferentially spaced-apart cooling holes are provided in a concentric circular configuration around the at least one dilution or igniter hole.

13. The gas turbine engine combustor defined in claim 10, wherein the outlet end of each of the circumferentially spaced-apart cooling holes has an oval footprint on the front side of the heat shield, the oval footprint having a major axis and a minor axis, and wherein the major axis does not intersect the at least one dilution or igniter hole.

14. The gas turbine engine combustor defined in claim 13, wherein the major axis is oriented tangentially to the at least one dilution or igniter hole.

15. The gas turbine engine combustor defined in claim 13, wherein the major axis extends at an angle away from a tangent of the at least one dilution or igniter hole such that a thinnest wall region between the cooling holes and the at least one dilution or igniter hole is located between the back and front sides of the heat shield.

16. The gas turbine engine combustor defined in claim 10 wherein the inlet ends and the outlet ends respectively lie on first and second concentric circles around the at least one dilution or igniter hole, the second circle surrounding the first circle.

17. The gas turbine engine combustor defined in claim 10, wherein the circumferentially spaced-apart cooling holes are distributed along only a portion of a circumference of the at least one dilution or igniter hole to form a partial ring of locally swirling cooling holes.

18. The gas turbine engine combustor defined in claim 10, wherein a hole is defined in the shell, and wherein the inlet ends of the circumferentially spaced-apart cooling holes are disposed in an annular space between the hole and the at least one dilution or igniter hole.

19. A heat shield configured to be mounted to an inner surface of a combustor shell defining a combustion chamber of a gas turbine engine combustor; the heat shield comprising: a heat shield body having a first surface configured to face the combustor shell and an opposed second surface configured to face toward combustion gases in the combustion chamber; a boss formed in the heat shield body; at least one dilution or igniter hole defined in the boss; and an array of circumferentially spaced-apart cooling holes bordering the at least one dilution or igniter hole and extending through the boss, the array of circumferentially spaced-apart cooling holes oriented to deliver a swirl of cooling air around an axis of the at least one dilution or igniter hole, the circumferentially spaced-apart cooling holes extending at an inclination angle relative to a normal of the first surface of the heat shield body, the circumferentially spaced-apart cooling holes extending from an inlet on the first surface to an outlet on the second surface, the outlet being closer to a perimeter of the at least one dilution or igniter hole than the inlet, wherein each outlet of the circumferentially spaced-apart cooling holes has an oval footprint on the second surface of the heat shield body, the oval footprint having a major axis and a minor axis, and wherein the major axis does not intersect the at least one dilution or igniter hole.

20. A gas turbine engine combustor comprising: a shell defining a combustion chamber; a heat shield mounted to an inner surface of the shell and having a back side facing the inner surface of the combustor shell and an opposed front side facing the combustion chamber; a boss formed in the heat shield; at least one dilution or igniter hole extending through the boss; and an array of circumferentially spaced-apart cooling holes extending through the boss around the at least one dilution or igniter hole and oriented to deliver cooling air in a circular pattern around the at least one dilution or igniter hole, each of the circumferentially spaced-apart cooling holes extending from an inlet end on the back side of the heat shield to an outlet end on the front side of the heat shield, the circumferentially spaced-apart cooling holes being angled relative to the heat shield so that the outlet end be disposed closer to the at least one dilution or igniter hole than the inlet end, wherein a hole is defined in the shell, and wherein the inlet ends of the circumferentially spaced-apart cooling holes are disposed in an annular space between the hole and the at least one dilution or igniter hole.

* * * * *